May 14, 1968     F. A. HOHLER     3,382,623

GRINDING MACHINE

Original Filed Aug. 17, 1962     13 Sheets-Sheet 1

INVENTOR
Frederick A. Hohler
BY
Attorney

May 14, 1968 — F. A. HOHLER — 3,382,623
GRINDING MACHINE
Original Filed Aug. 17, 1962 — 13 Sheets-Sheet 2

INVENTOR
Frederick A. Hohler
BY
Norman S. Blodgett
Attorney

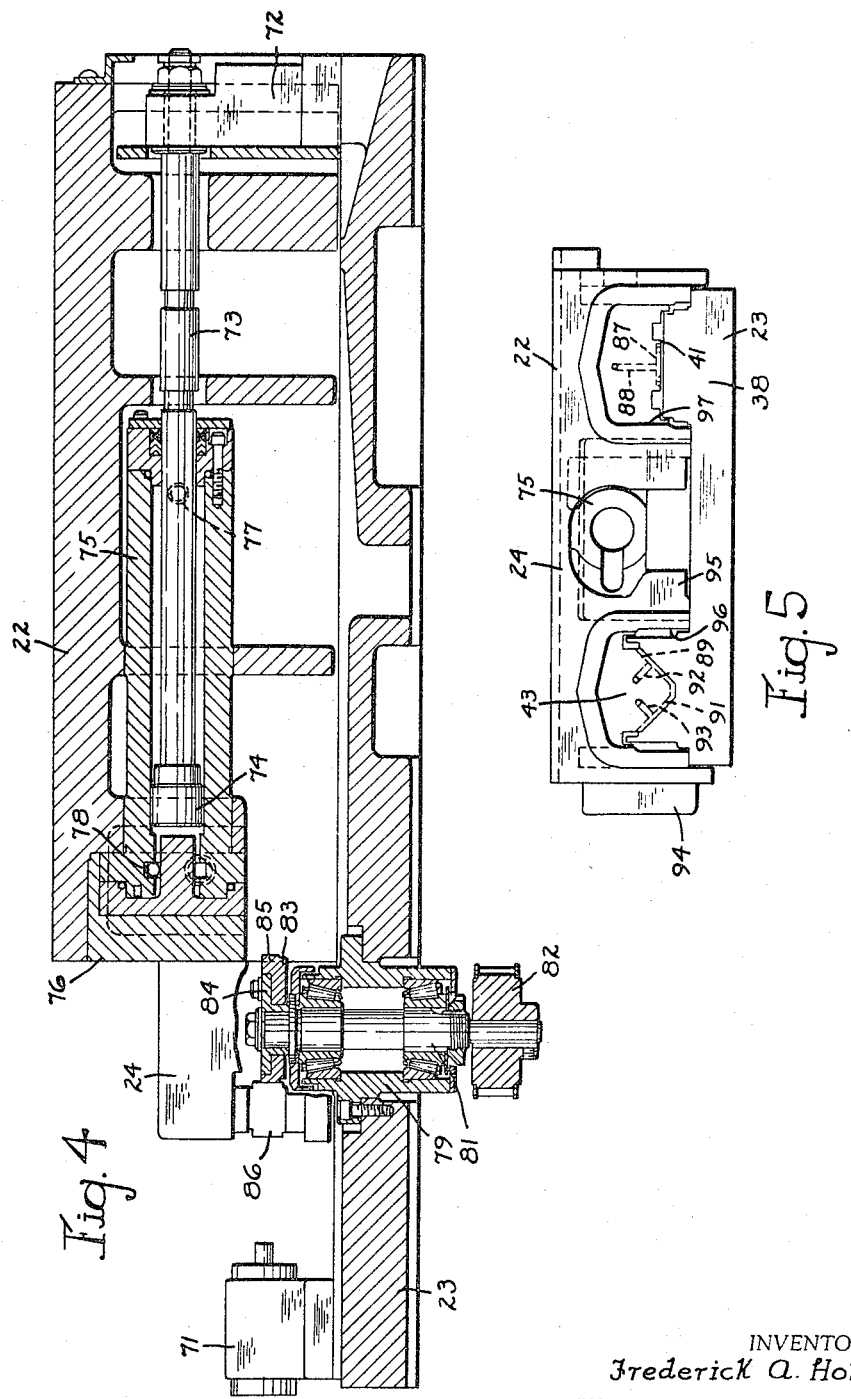

INVENTOR
Frederick A. Hohler
BY
Attorney

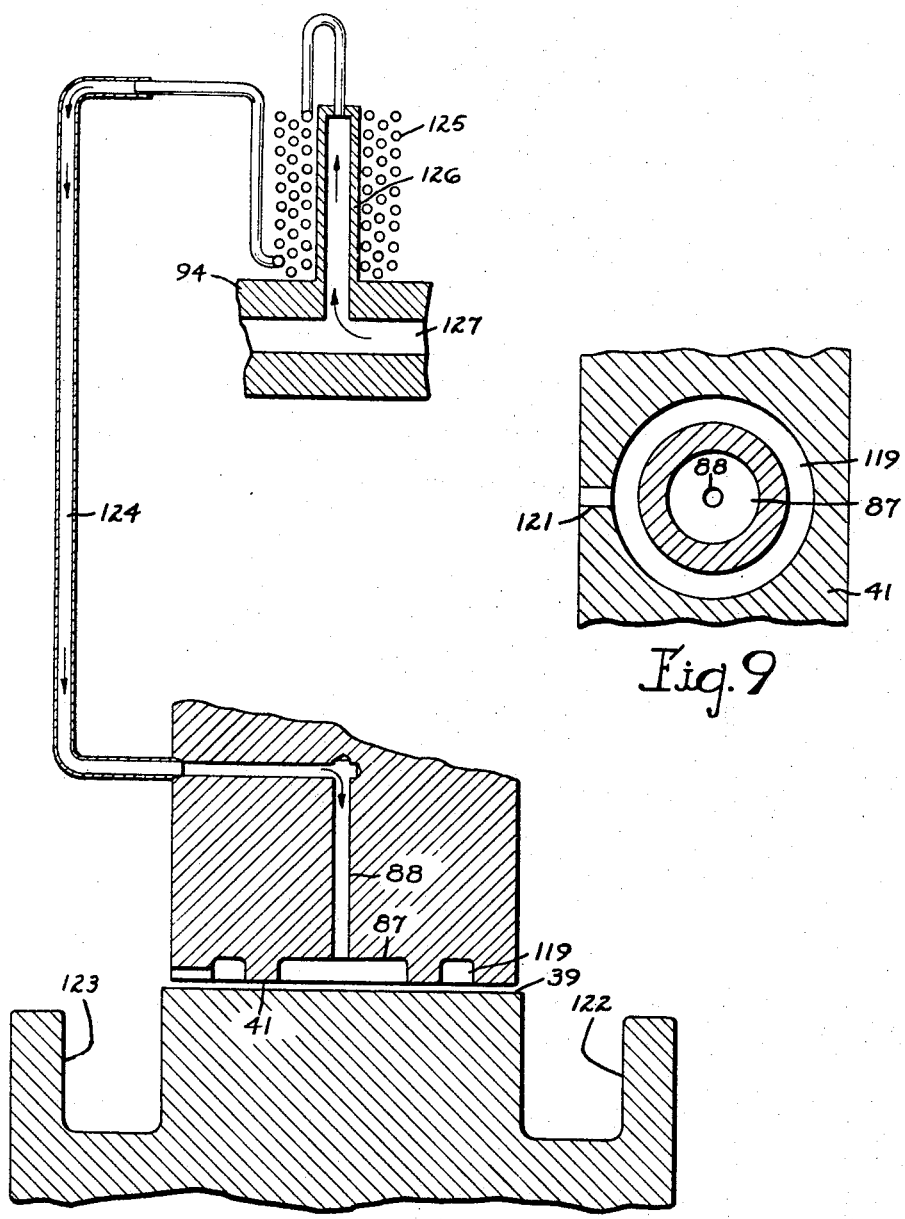

May 14, 1968  F. A. HOHLER  3,382,623
GRINDING MACHINE
Original Filed Aug. 17, 1962  13 Sheets-Sheet 7
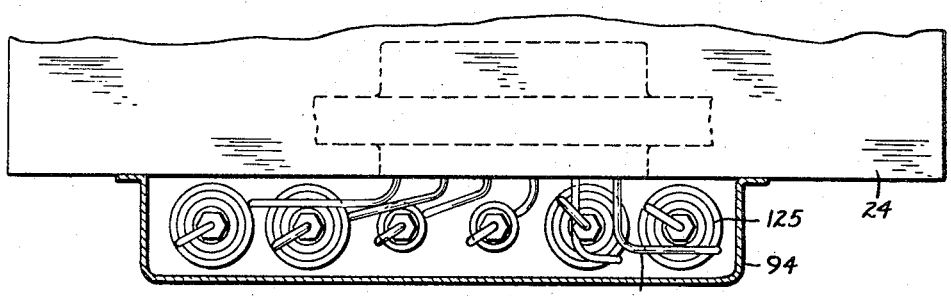
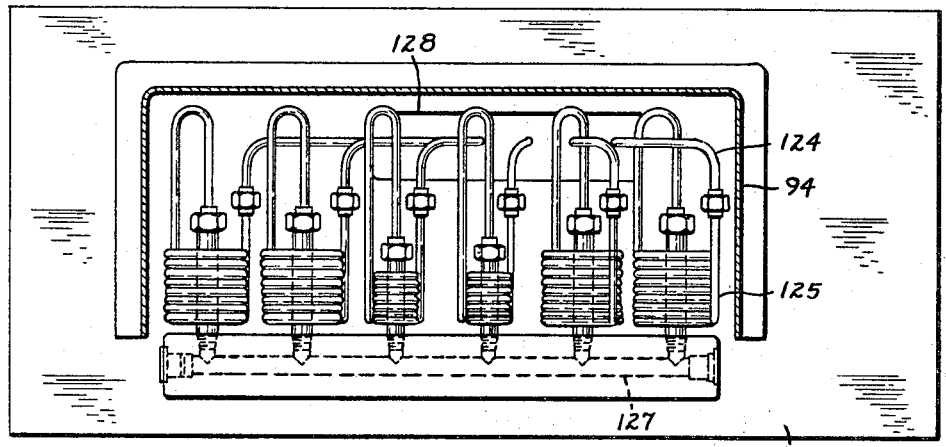
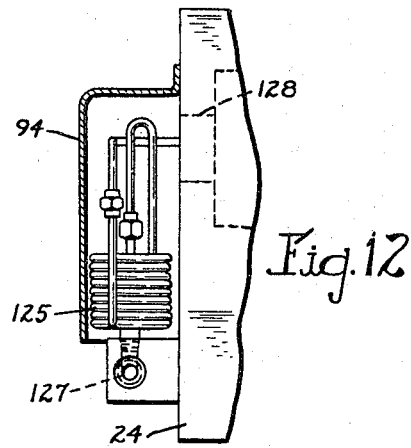
INVENTOR
Frederick A. Hohler
BY
Attorney INVENTOR
Frederick A. Hohler
BY
Attorney May 14, 1968 F. A. HOHLER 3,382,623
GRINDING MACHINE Original Filed Aug. 17, 1962 13 Sheets-Sheet 9

INVENTOR
Frederick O. Hohler
Attorney

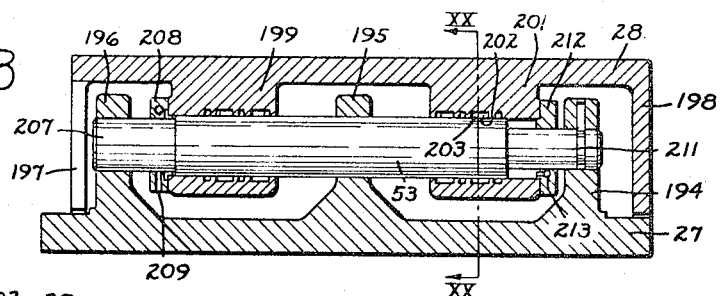
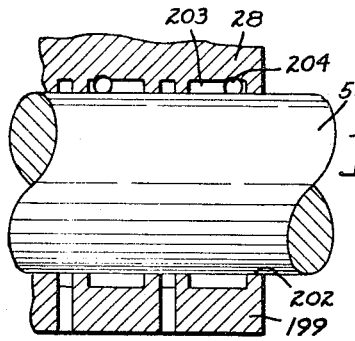
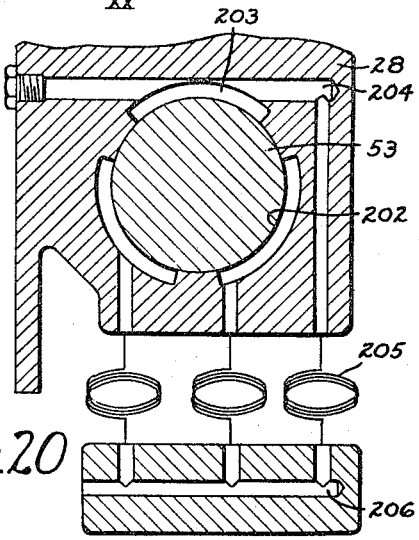
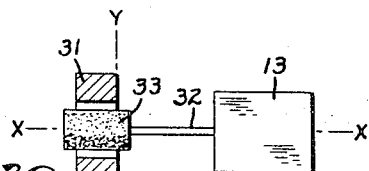
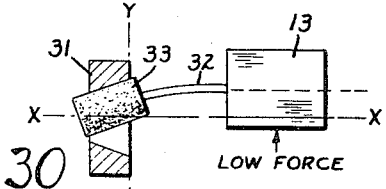
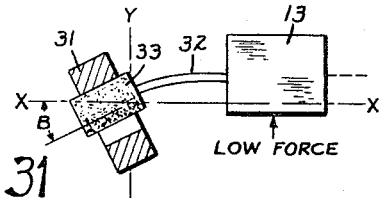
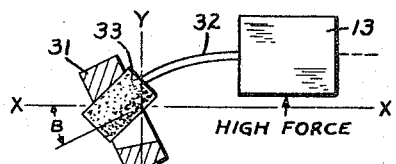
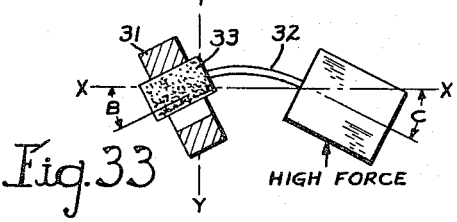

May 14, 1968 F. A. HOHLER 3,382,623
GRINDING MACHINE

Original Filed Aug. 17, 1962 13 Sheets-Sheet 11

INVENTOR
Frederick A. Hohler
BY
Attorney

May 14, 1968
F. A. HOHLER
3,382,623
GRINDING MACHINE
Original Filed Aug. 17, 1962
13 Sheets-Sheet 12
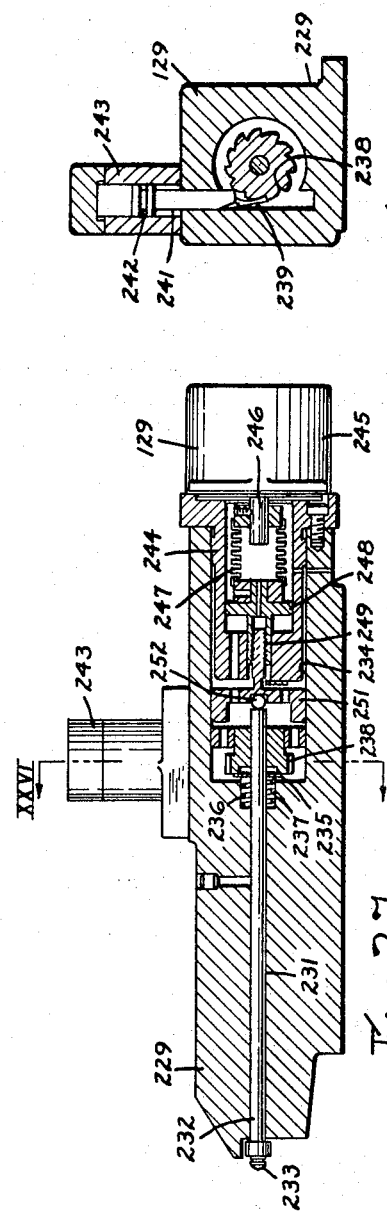
INVENTOR
Frederick A. Hohler
BY
Clarence P. Blodgett
Attorney

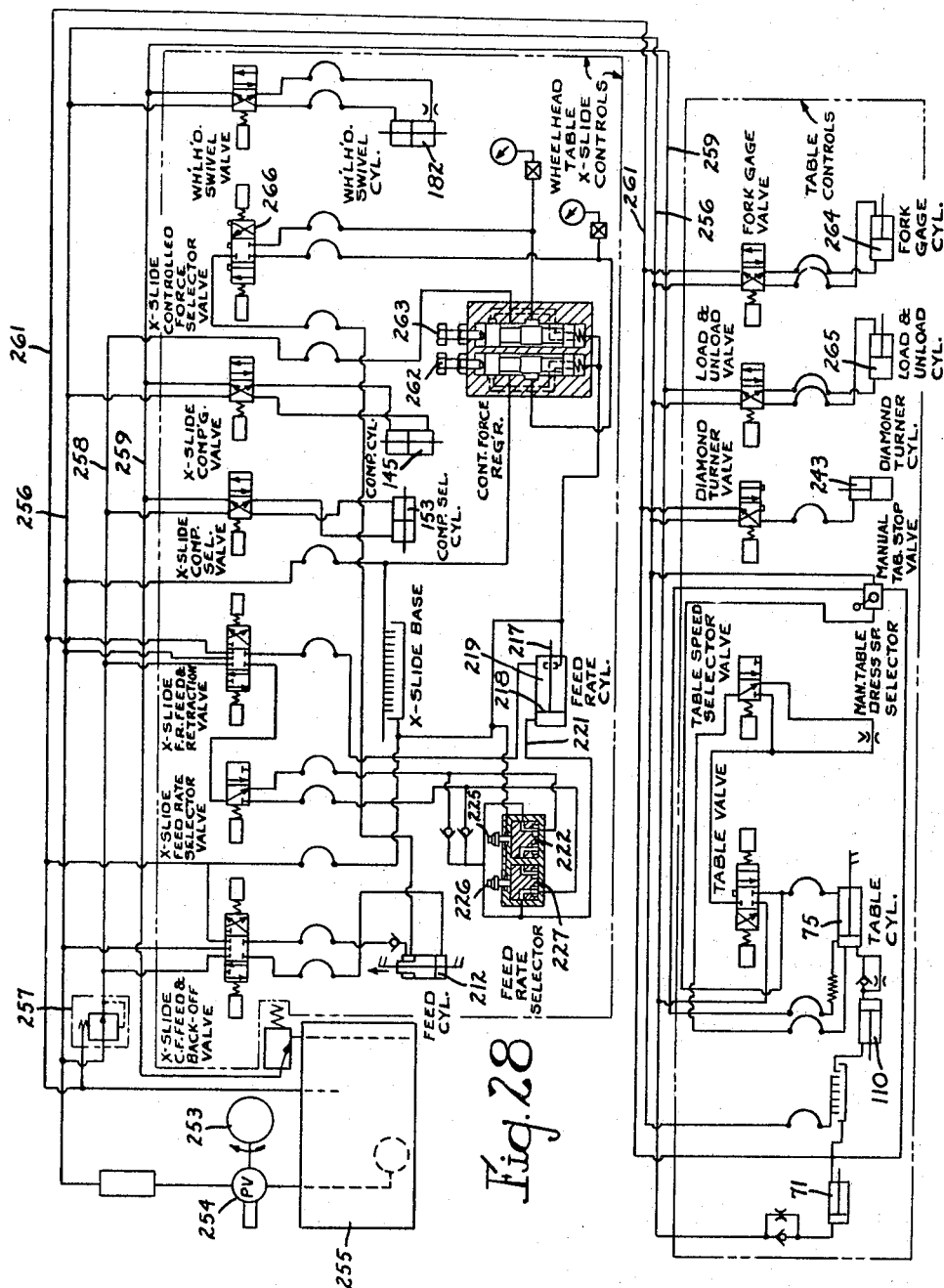

United States Patent Office 3,382,623
Patented May 14, 1968

3,382,623
GRINDING MACHINE
Frederick A. Hohler, Holden, Mass., assignor to The Heald Machine Company, Worcester, Mass., a corporation of Delaware
Original application Aug. 17, 1962, Ser. No. 217,683, now Patent No. 3,197,921, dated Aug. 3, 1965. Divided and this application Apr. 28, 1965, Ser. No. 451,550
5 Claims. (Cl. 51—165)

ABSTRACT OF THE DISCLOSURE

This invention has to do with the generation of surfaces of revolution by the abrasive process in which an abrasive wheel is fed into the surface of a workpiece with a controlled force.

This is a divisional application of the co-pending patent application of Frederick C. Hohler and Robert S. Hahn, Ser. No. 217,683, filed Aug. 17, 1962, now Patent No. 3,197,921 issued Aug. 3, 1965.

In the machining of surfaces of revolution by grinding, great strides have been made in making the operation independent of the machine operator, largely because of the high cost of skilled labor. Automatic machines are very expensive and represent a capital investment, which must be used continually and as efficiently as possible. For that reason, these machines are designed to carry out the grinding cycle as quickly as possible. However, while it has become necessary to operate grinding machines at higher material removal rates, the demand for accuracy and quality of finish has also increased, particularly in fields such as the grinding of races of ball and roller bearings. The rate of stock removal is limited by the strength of the grinding wheel and by the fact that at fast stock removal rates the surface finish suffers. These and other difficulties experienced with the prior art devices have been obviated in a novel manner by the present invention.

It is, therefore, an outstanding object of the invention to provide a grinding machine capable of fast rate of stock removal without loss of adequate surface geometry and finish.

Another object of this invention is the provision of a grinding machine making use at all times of the extreme pressures possible with a particular wheel without danger of exceeding these pressures.

Another object of this invention is the provision of a grinding machine in which geometric inaccuracies due to vibration have been reduced to a minimum by reducing overhung or cantilevered elements in the machine.

It is another object of the instant invention to provide a grinding machine using extremely high grinding forces in which taper variations (due to variations in rough stock dimensions which effect wheel spindle deflection) is reduced to a minimum.

It is a further object of the invention to provide a grinding machine making use of the controlled-force principle of grinding in which the necessary length of the wheel spindle may be relatively short.

A still further object of this invention is the provision of a grinding machine in which means is provided to assure that swarf and moisture do not gain access to the vital parts of the machine mechanisms.

It is a still further object of the present invention to provide a grinding machine capable of use with either the controlled-force or the controlled-rate principle in which the mechanism for these two methods of operation are inter-related in such a way that the controlled-force mechanism limits the grinding forces even when the controlled-rate mechanism is being used.

Another object of the invention is the provision of a grinding machine capable of accepting larger rough stock variations and yet produce a finished workpiece of adequate size, surface finish, and geometry.

Another object of the invention is the provision of a grinding machine in which the spindle deflection is maintained at a known preset amount at any part of the grinding cycle and for which compensation is fully made.

Another object of the invention is the provision of a grinding machine having an accurate, fast back-off at the end of the grinding cycle thus eliminating a troublesome run-out line and permitting the use of a fixed diamond for dressing.

Another object of the invention is the provision of a grinding machine having few vibration problems because of the absence of variable table overhang to cause chatter, because of the use of a diamond mounting which is less susceptible to excitation, and because of the provision of well-damped table slides which minimize troublesome machine resonances.

Another object of the invention is the provision of a grinding machine having a workhead table whose sliding ways are constructed so that a substantial mating surface lies perpendicular to the grinding force resultant, thus reducing table movement relative to the ways.

Another object of the invention is the provision of a grinding machine in which the table ways are provided with a novel hydrostatic lubrication system which increases the table rigidity and reduces vibrations.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which:

FIG. 4 is a longitudinal vertical sectional view of the workhead table taken on the line IV—IV of FIG. 6;

FIG. 5 is an end elevational view of the table;

FIG. 8 is a schematic view of a hydrostatic lubrication system incorporated in the machine;

FIG. 9 is a plan view of a hydrostatic pocket;

FIG. 10 is a plan view of part of the hydrostatic lubrication system;

FIG. 11 is an elevational view of the apparatus shown in FIG. 10;

FIG. 12 is a vertical sectional view of the hydrostatic lubrication system;

FIG. 18 is a vertical sectional view of the wheelhead table taken on the line XVIII—XVIII of FIG. 13;

FIG. 19 is an enlarged view of a portion of the apparatus shown in FIG. 18;

FIG. 20 is a vertical sectional view of the apparatus taken on the line XX—XX of FIG. 18;

FIG. 25 is a plan view of a dressing apparatus forming part of the invention;

FIG. 26 is a vertical sectional view of the apparatus taken on the line XXVI—XXVI of FIG. 27;

FIG. 27 is a vertical sectional view of the invention taken on the line XXVII—XXVII of FIG. 25;

FIG. 28 is a schematic view of the hydraulic and electrical equipment controlling the operation of the machine; and FIGS. 29 through 33 are schematic views showing the relationship of the parts.

Figure 1:
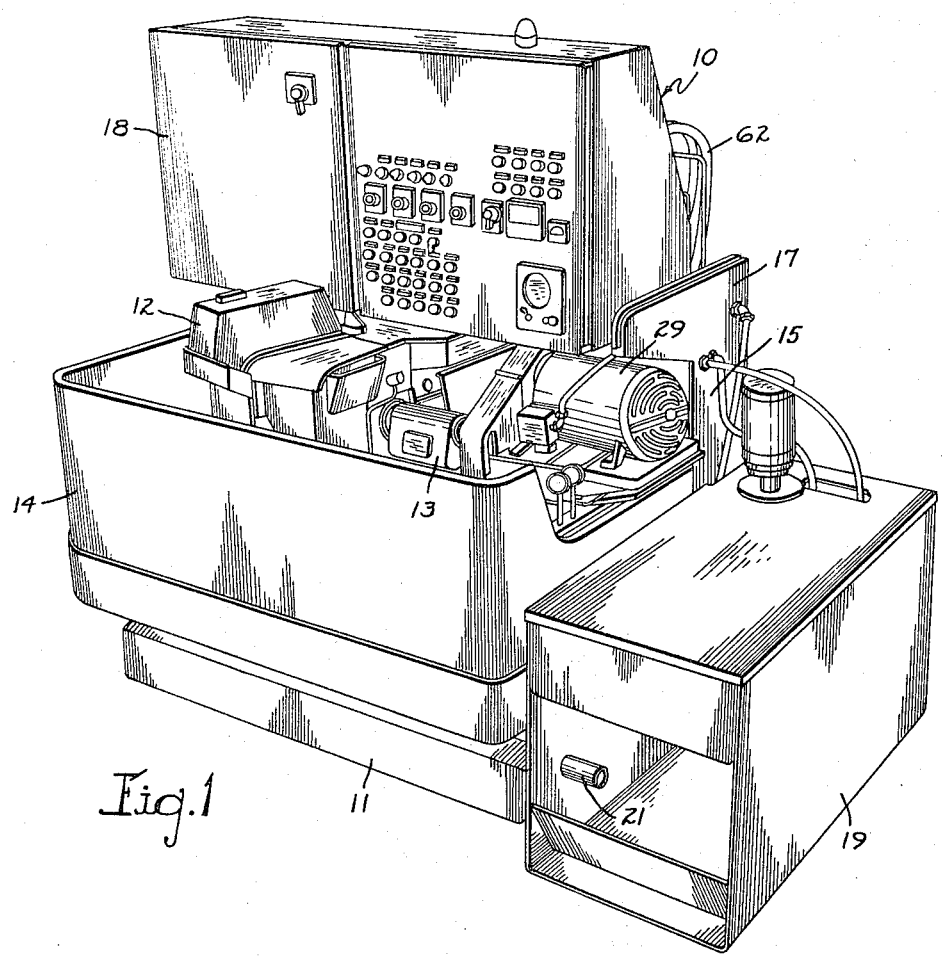
FIG. 1 is a perspective view of a grinding machine embodying the principles of the present invention.

Referring first to FIG. 1, wherein are best shown the general features of the invention, the grinding machine, indicated generally by the reference numeral 10, is shown as provided with a lower base 11 on which is mounted a workhead 12 and a wheelhead 13. Around the front of the base extends a splash guard 14 which is readily removable. Extending upwardly from the rear of the base 11 is a superstructure 15 having arms 16 and 17 (see FIG. 3) which extend forwardly from the ends of the base. Mounted between the arms is a control cabinet 18. At one end of the machine is located a coolant tank 19 receiving coolant returned from the machine through a pipe 21.

Figure 2:
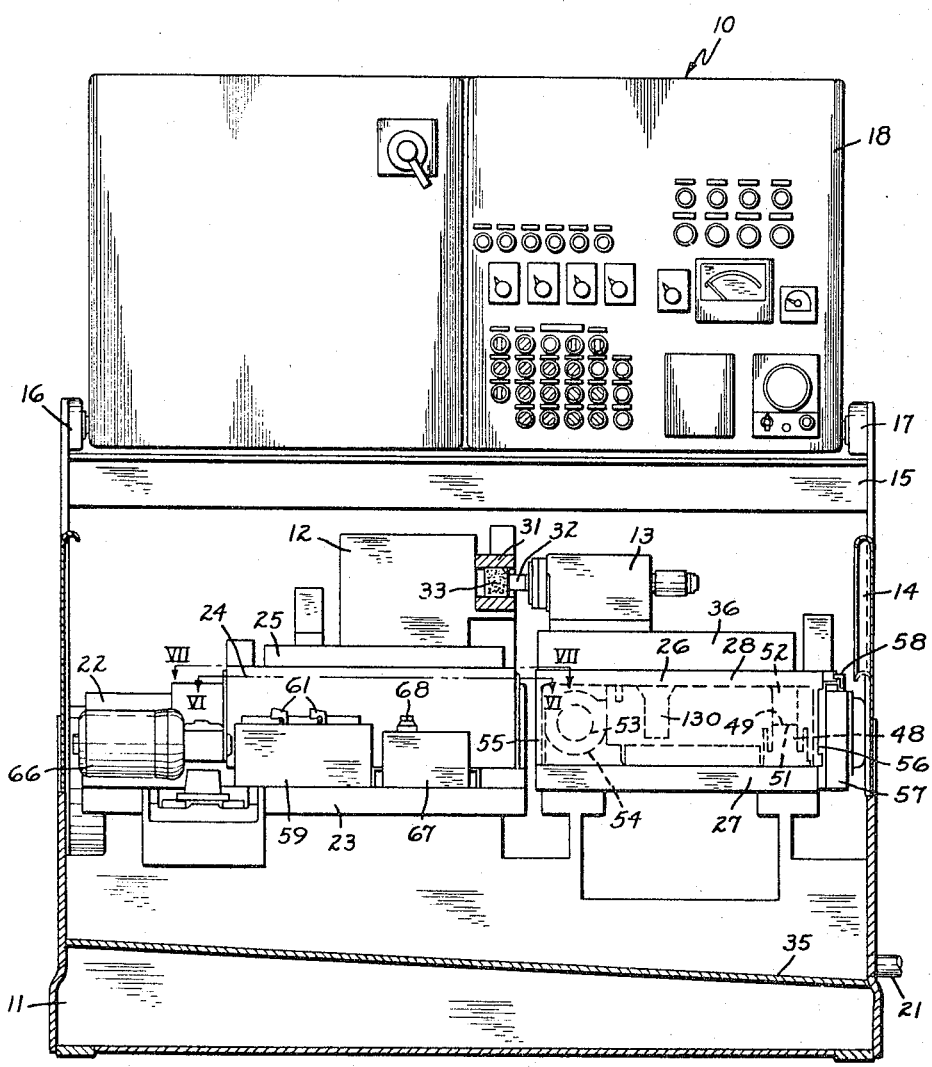
FIG. 2 is a front elevational view of the machine with portions removed.
Figure 3:
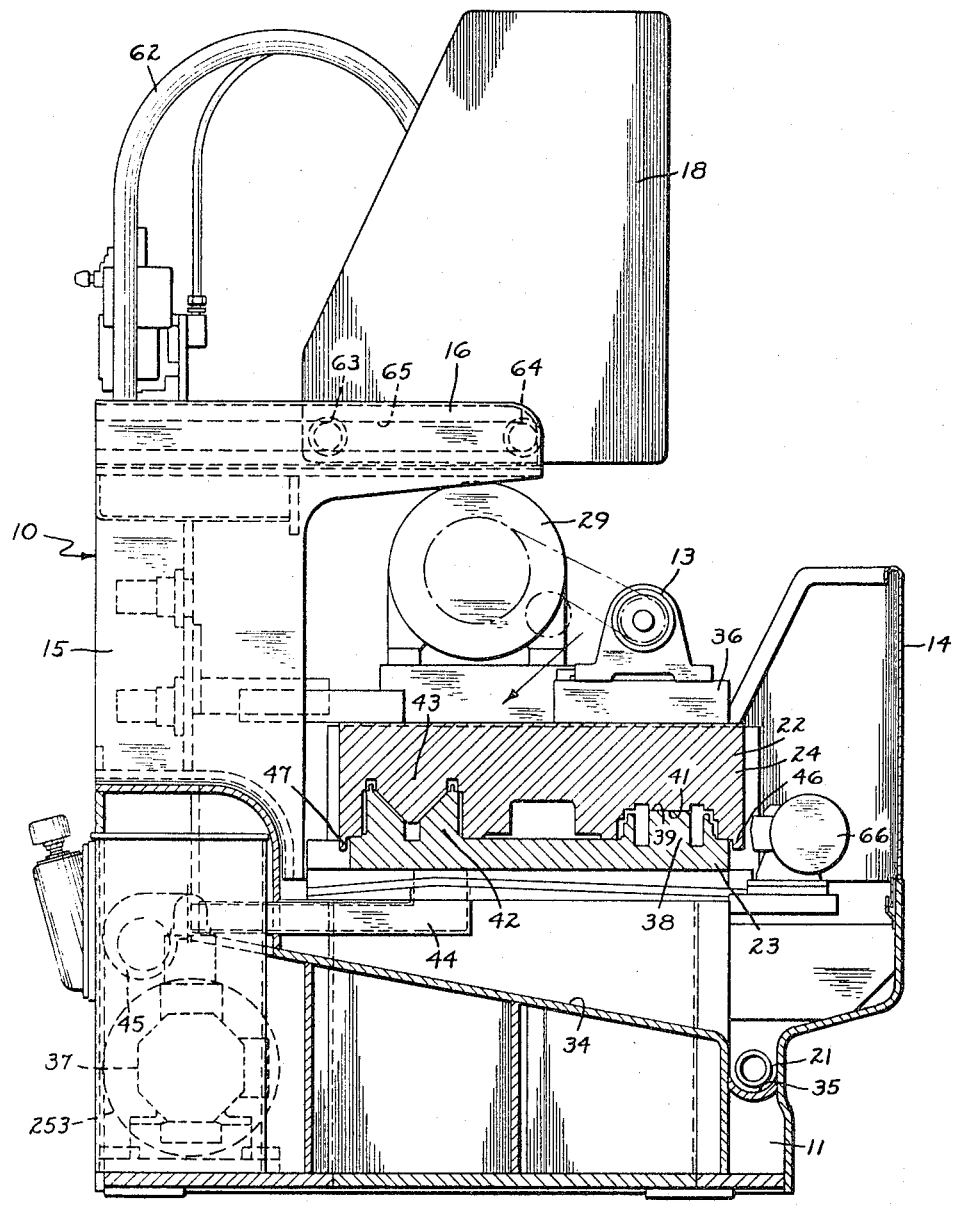
FIG. 3 is a left-hand elevational view of the machine.

FIGS. 2 and 3 show further details of the machine. Parts of the machine are removed or are shown schematically for the purpose of clarity of description. Mounted on the lower base 11 and supporting the workhead 12 is a workhead table 22 consisting of a lower member 23 which is bolted to suitable horizontal surfaces of the lower base and an upper member 24. Mounted on the upper horizontal surface of the upper member 24 is a swivel member 25 on which the workhead is directly bolted. Also mounted on suitable upper horizontal surfaces of the lower base 11 is a wheelhead table 26 consisting of a lower member 27 which is directly bolted to the base and an upper member 28 on which is mounted a swivel member 36 to which is bolted the wheelhead 13 and its drive motor 29. The workhead 12 is of the usual type carrying a set of shoes on which an annular workpiece 31 is mounted for rotation about its axis. The workpiece 31 is shown as consisting of the outer race of a roller bearing. Extending from the wheelhead 13 is a spindle 32 on which is mounted an abrasive wheel 33 arranged to grind an internal bore of the workpiece 31.

As is evident in the drawings, the lower base 11 is provided with a series of forwardly-and-downwardly inclined transverse chutes 34 which terminate in a longitudinal trough 35 leading to the drainage pipe 21.

Mounted in the rear of the lower base is a self-contained hydraulic unit 37 containing a motor, pump, and sump adapted to supply hydrostatic oil to the ways. The upper member 24 of the workhead table 22 is capable of movement relative to the lower member 23 in the general direction of the axis of the workpiece 31 which, for the purposes of description, will be described hereinafter as the "longitudinal" direction. For this purpose, the lower member 23 is provided with a way 38 having a longitudinally-elongated, upwardly-facing horizontal bearing surface 39, while the upper portion 24 is provided with a suitable groove in which the way resides, the groove having a downwardly-facing horizontal flat surface 41. The lower member 23 is also provided with an upwardly-directed V-way 42 which resides in a suitable longitudinal groove in the lower part of the upper member 24, which groove is provided with a V-shaped abutment 43 which resides in the V-way 42. The V-way 42 is substantially spaced rearwardly from and parallel to the way 38 and the line of action of the workpiece 31 and the wheel 33 is located substantially above the way 38. The surface 39 of the way 38 and its mating surface 41, on the one hand, and the V-way 42 and the V-shaped abutment 43, on the other hand, are both provided with hydrostatic lubrication, as will be described more fully hereinafter. The spaces existing between the upper member 24 and the lower member 23 of the workhead table 22 have connected thereto a conduit 44 leading to a fan 45 located at the rear of the base 11. It should be noted that the upper member 24 is provided with a generous apron 46 which extends downwardly over the forward surface of the lower member 23, while a similar apron 47 extends downwardly over the rearward surface of the lower member 23.

Referring particularly to FIG. 2, it can be seen that the upper member 28 of the wheelhead table 26 is arranged for transverse rectilinear movement relative to the lower member 27. For this purpose, the lower member 27 is provided with an upwardly-directed abutment 48 having a horizontal transversely-extending surface 49 which lies against a downwardly-directed surface 51 provided on a similar matching abutment 52 extending downwardly in the interior of the upper member 28. The upper member 28 is provided with a guide bar 53 suitably mounted on its upper surface and slidable in bores on downwardly-extending abutments 54 extending from the upper member 28. The upper member 28 is provided with an apron 55 which extends downwardly over the left-hand surface of the lower member 27 and with an apron 56 which extends over the right hand surfaces of the lower member 27. Generally speaking, therefore, the wheel 33 will be fed toward the surface which is to be ground by means of the relative movement of the upper member 28 over the lower member 27 of the wheelhead table 26. In a similar manner, the workpiece 31 will be advanced longitudinally toward the wheel 33 and reciprocated relative thereto during the grinding operation by means of a longitudinal sliding movement between the upper member 24 of the workhead table 22 and the lower member 23. Mounted at the right hand end of the lower member 27 is a switch box 57 in which are mounted various switches having their contact elements extending upwardly from its upper surface. Mounted on the upper member 28 are a series of adjustable dogs 58 adapted to contact the switches at important parts of a long series of grinding cycles. The switches will indicate when the wheel is worn and will also indicate when the position of the table is reached for a new wheel and will show the position after a new wheel dress. In a similar way, mounted on the front surface of the lower member 23 of the workhead table 22 is a switch box 59 carrying a series of switches having their actuating elements extending upwardly therefrom; mounted on the front surface of the upper member 24 are a series of dogs 61 indicating, in the usual manner, important points in the longitudinal movement of the workhead. Such points would be the extreme retraction position necessary for changing the wheel and the extreme longitudinal movement for dressing the wheel. Extending upwardly from the superstructure 15 to the control cabinet 18 are a series of cables 62 which are of the flexible variety to permit forward and rearward movement of the control cabinet 18 is provided with two wheels 63 and 64 which ride in a rail 65 carried by the arm 16. The right-hand side of the control cabinet 18 and the arm 17 of the superstructure are similarly provided with wheels and a rail to permit movement of the control cabinet from a forward position, as shown in FIG. 3 (where it is readily accessible from the front of the machine but overlies the working elements of the machine), to a rearward position in which it is not readily accessible but is out of the way of the important elements of the machine. As is particularly evident in FIGS. 2 and 3, an oscillator motor 66 and a valve box 67 with an adjusting knob 68 are mounted at the front of the machine.

FIGS. 4 and 5 show the workhead table 22 with the swivel member 25 and the workhead 12 removed. The lower member 23 is provided with an upstanding shock absorber 71 which is in position to contact the upper member 24 in its extreme left-hand position and to limit its movement in that direction. The lower member 23 is also provided with an upstanding abutment 72 which lies in the transverse direction between the way 38 and the V-way 42. Bolted in the abutment 72 is a piston rod 73 which extends to the left and is provided at its free end with a piston 74 which slides in a cylinder 75. The cylinder is mounted on a downwardly-extending flange 76 of the upper member 24 and extends to the right therefrom. Oil is admitted to the right-hand side of the piston 74 through a port 77 in the side of the cylinder. Oil is admitted to the left-hand side of the piston 74 through a port 78 in the cylinder 75. Mounted at the left-hand side of the lower member 23 is a roller bearing 79 carrying within its inner race a vertical shaft 81 to the lower end of which is keyed a pulley 82. On the upper end of the shaft 81 is mounted a cam 83 which is of the split variety having an inner portion 84 which is fixed to the top of the shaft and an outer portion 85 which is adjustably carried by the inner portion. The two portions are adjustable in a rotational direction to control the amount of throw of the cam as a whole. Mounted on the left end of the upper portion 24 is a cam follower 86 of the roller type.

Particularly evident in FIG. 4 is the manner in which the lower member 23 is provided with passages and recesses leading to the large spaces between the upper and lower members of the workhead table. This permits the flow of air originating in the fan 45 and the conduit 44 to pass up between the two elements of the table to cause the flow of air outwardly through the exposed spaces between these elements. This has the effect of assuring that abrasive swarf and moisture do not gain admittance to the sliding elements.

FIG. 5 shows the workhead table as viewed from the extreme left-hand end. It can be seen that the downwardly-directed surface 41 of the upper member 24 is provided with a hydrostatic pocket 87 which is furnished with oil through a passage 88. Similarly, the two flat surfaces of the V-shaped abutment 43 are provided with hydrostatic pockets 89 and 91 provided with oil through passages 92 and 93, respectively. The passages leading to the hydrostatic pockets all lead back to a hydrostatic oil box 94 mounted at the rear of the upper member 24. The left-hand end of the upper member 24 is provided with an apron 95 which extends downwardly adjacent the upper surfaces of the lower member 23. Two doorways 96 and 97 are formed in this apron to permit the passage of the V-way 42 and the way 38, respectively. Suitable flexible webs are mounted in these doorways and restrict the flow of air through these door openings. The right-hand end of the upper member 24 is similarly formed to permit the movement of the table over the ways.

Figure 6:
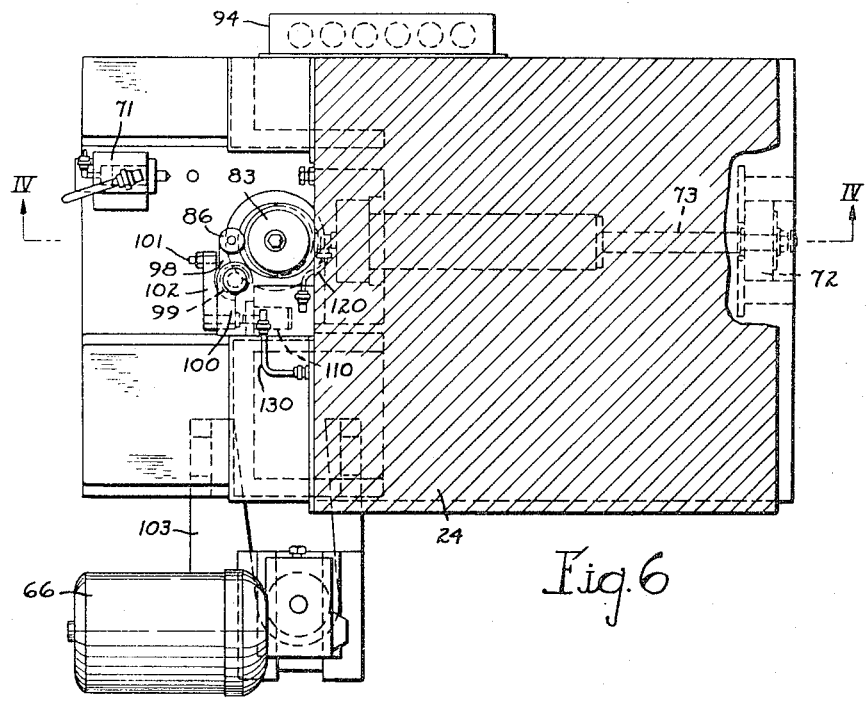
FIG. 6 is a plan view of the table taken at the horizontal level VI—VI of FIG. 2.

FIG. 6 shows particularly well the manner in which the cam follower 86 is mounted on the outer end of a crank arm 98 which is mounted for pivoting about a vertical pivot pin 99. The central portion of the crank arm engages an adjusting screw 101 which is mounted on a plate 102 which extends transversely from the upper member 24. This view shows the manner in which the oscillating motor 66 is fastened to the front of the wheelhead table by means of a bracket 103. The crank arm 98 is provided with a free end 100 which is engaged by a piston rod of a piston 110 lying in a cylinder bore formed in the upper member 24 of the workhead table. Leading to opposite sides of the piston 110 are pressure oil conduits 120 and 130, so that the piston 110 acts as a shock absorber and also to maintain the crank arm in a normal position of clockwise rotation about its pivot pin 99.

Figure 7:
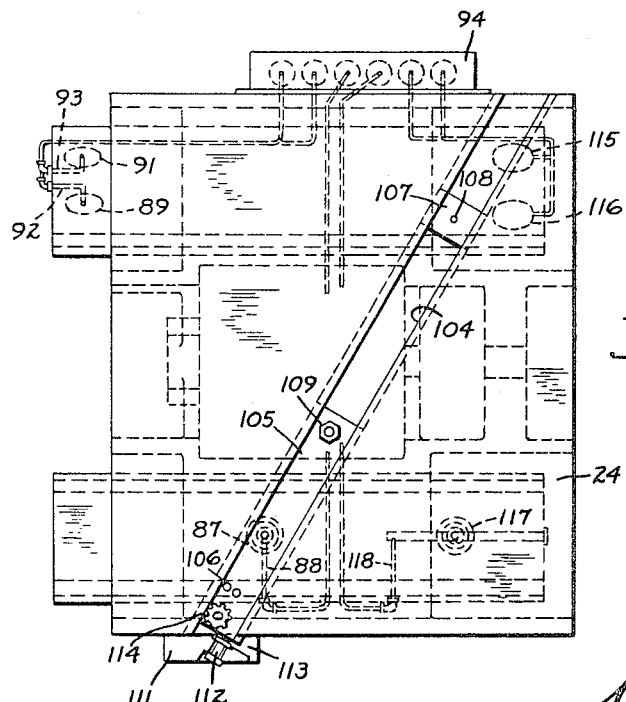
FIG. 7 is a plan view of the workhead table taken at a higher level VII—VII of FIG. 2.

FIG. 7 shows in plan view the upper member 24 of the workhead table with the swivel member and the workhead removed and without any other elements extending below it. In this way, it can be seen that the top of the upper member is provided with a slot 104 of T-shaped cross-section. In this slot is mounted a slide 105, the arrangement being such that the slide moves in the slot diagonally across the top of the upper member 24. The slide is provided near its forwardmost end with a threaded aperture 106 adapted to receive a bolt for mounting the swivel member. A small slide 107 also is mounted in the slot 104 and is provided with a threaded aperture 108 adapted to receive a bolt for mounting the swivel member. At the rearwardmost end of the slide 105 is mounted a bolt 109 adapted to receive a nut, the bolt extending through a closely-fitting bore in the swivel member 25. On the front of the upper member 24 is mounted a plate 111 carrying a screw 112 which engages the slide 105 and causes it to be moved along the slot, the screw 112 being provided with a socket for the reception of a crank. Mounted on the upper surface of the slide 105 is an abutment 113 carrying a pinion gear 114 adapted to engage a circular rack formed in the swivel member 25. The gear is provided with a suitable socket to receive the same wrench which is used to actuate the screw 112. This view shows particularly well the hydrostatic pads 89 and 91 and their corresponding supply passages 92 and 93. Another pair of such pockets 115 and 116 are provided at the other end of the V-shaped abutment 43. In a similar manner, this view shows the pocket 87 and the passage 88 leading to it. Similarly, it shows another hydrostatic pocket 117 and a passage 118 leading to it, all of these oil passages leading to the hydrostatic oil box 94.

FIGS. 8 and 9 show the manner in which these hydrostatic pockets are formed. The pocket 87 in the surface 41 has the passage 88 entering it in its very center. The pocket is circular and is surrounded by an outwardly-spaced relief groove 119, which is annular and which is connected outwardly of the surface 41 by a radial groove 121. On either side of the way 38 are located drain ways 122 and 123 which receive the oil as it flows outwardly from between the surfaces 41 and 39. The passage 88 is connected by a steel tube 124 to the interior of the hydrostatic oil box 94, which contains a thin coil 125 of plastic tube which acts as a restriction to flow of oil to the hydrostatic pocket. The coil 125 surrounds a vertical entrance tube 126 whose lower end is connected to a broad manifold chamber 127, which is suitably supplied with clean oil under substantial pressure.

FIGS. 10, 11 and 12 shows the details of the hydrostatic oil box 94. All of the restriction coils, including the coil 125, are connected to receive oil from the manifold chamber 127 and are connected to a tube similar to the tube 124 leading into a recess 128 at the back of the upper member 24 and to a hydrostatic oil pocket in a way. It will be understood that the wheelhead table 26 will be provided with a similar hydrostatic oil box for providing suitable oil to the hydrostatic oil pockets in its ways.

Figure 13:
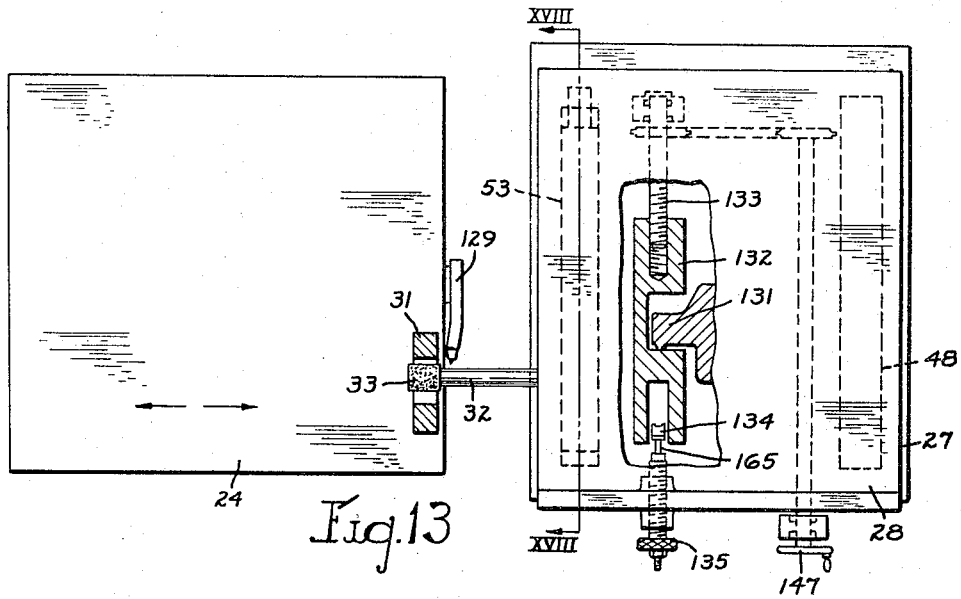
FIG. 13 is a somewhat schematic plan view of the apparatus showing the compensation arrangement.

FIG. 13 shows more or less schematically the manner in which compensation takes place after dressing of the abrasive wheel. As has been described above, the upper member 28 is mounted on top of the lower member 27 for transverse sliding movement over the abutment 48 and the guide bar 53. Motion takes place by admitting oil to the ends of the guide bar, which is fixed relative to the lower member 27. This view shows the dressing apparatus 129 mounted on the upper member 24 of the workhead table. To move the wheel 33 away from the surface of the workpiece 31 which is to be ground, oil is admitted to the front part of the guide bar 53, whereas, to provide normal cross feed of the wheel toward the surface of the workpiece, oil is admitted to the rearward end of the guide bar. Motion of the upper member 28 relative to the lower member 27 in the forward direction is regulated by the engagement of a stop 131 on the upper member 28 with a compensating slide 132 connected to the lower member 27. The compensating slide is adjustable relative to the lower member 27 to which it is attached by means of engagement with a compensating screw 133 which may be rotated either by hand or automatically, as will be described. In the rearward direction, the feed is limited by the engagement of a switch 134 mounted on the compensating slide 132 with a pin 165 which is mounted on the front of the upper member 28 and which is adjustable by means of a knob 135.

Figure 14:
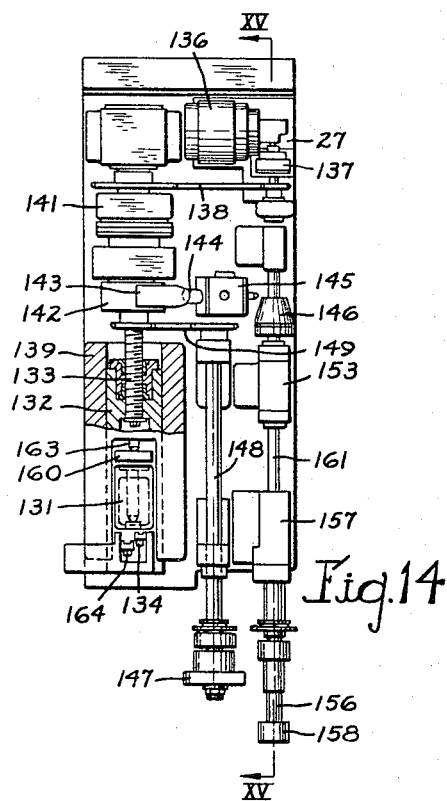
FIG. 14 is a plan view of the compensating apparatus.
Figure 15:
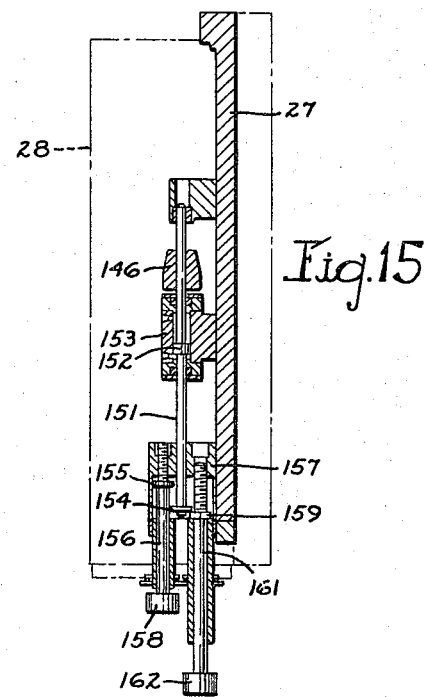
FIG. 15 is an elevational sectional view of the compensating apparatus taken on the line XV—XV of FIG. 14.

FIGS. 14 and 15 show the details of construction of the compensating mechanism. A reset motor 136 is mounted on the lower member 27 and is connected through a gear reduction unit 137 and a chain drive 138 to the compensating screw 133 which engages the compensating slide 132. As is evident in the drawing, the compensating slide is slidable in a horizontal guideway 139 fastened to the upper surface of the lower member 27. Next to the chain drive 138 is an electric clutch 141 driving through a one-way rotary clutch 142, the output of which drives the compensating screw 133. The outer shell of the clutch 142 is connected to a metal band 143, the other end of which is attached to a piston rod 144 of a compensating cylinder 145. The rod extends entirely through the cylinder and out the other end in position to engage a cone 146. It is possible to drive the compensating screw by means of a handwheel 147 at the front of the machine, which operates through a shaft 148 and a chain drive 149 to rotate the compensation screw 133. The length of the stroke of the piston in the cylinder 145 is determined by the setting of the cone 146, since this limits the stroke of the piston rod 144 as it operates through the one-way rotary clutch to rotate the compensating screw 133. As is evident in FIG. 15, the cone 146 is mounted on an elongated shaft 151 suitably carried in bushings. The shaft is provided in its central portion with a piston 152 which lies in a cylinder 153 which is fastened to the lower member 27. Suitable ports at either end of the cylinder 153 permit the admission of pressure oil to cause the piston 152 to reside at one end or the other of the cylinder. The end of the rod 151 opposite the end which carries the cone 146 is provided with an outwardly-extending flange 154 which is engageable at one end of piston travel with a flange 155 on one end of a shaft 156. This shaft is threaded through a block 157 which is fastened to the lower member 27. The position of the shaft 156 and, therefore, of the flange 155 is adjustable from the front of the machine by means of a knob 158. At the position of the piston 152 closest to the front of the machine it engages a flange 159 mounted on a shaft 161 which is similarly threaded through and adjustable relative to the block 157 by means of a knob 162 which is accessible from the front of the machine. A spring-loaded pin 163 is mounted in a portion of the guideway 139 and presses against a portion of the compensating slide 132 to press it into the forwardmost position at all times. Mounted at the front of the compensating slide 132 is the switch 134 which terminates the grinding cycle and another switch 164 which terminates the "rough grind" portion of the cycle to set up the machine for the "finish grind" portion of the cycle in the usual manner. These switches are contacted by adjustable pins such as the pin 165 (see FIG. 13) which is adjustable by means of a knob 135 at the front of the machine. It should be pointed out that the guideway 139 is fastened firmly to the lower member 27 and carries the biasing pin 163. On the other hand, the compensating slide 132 and its attached abutment 160 are pressed forwardly by the pin 163 at all times and also are moved by the compensating screw 133. At the same time, the stop 131, the switch actuating pin 165, and the coresponding pin which strikes the switch 164 move with the upper member 28 of the wheelhead table. It will be understood that, in a general way, the motor 136 is only used to move the compensating slide back at the time that the wheel is worn and a new wheel is placed on the spindle. The normal compensating movements of the screw 133 take place under the impetus of the compensating cylinder 145.

Figures 16, 17:
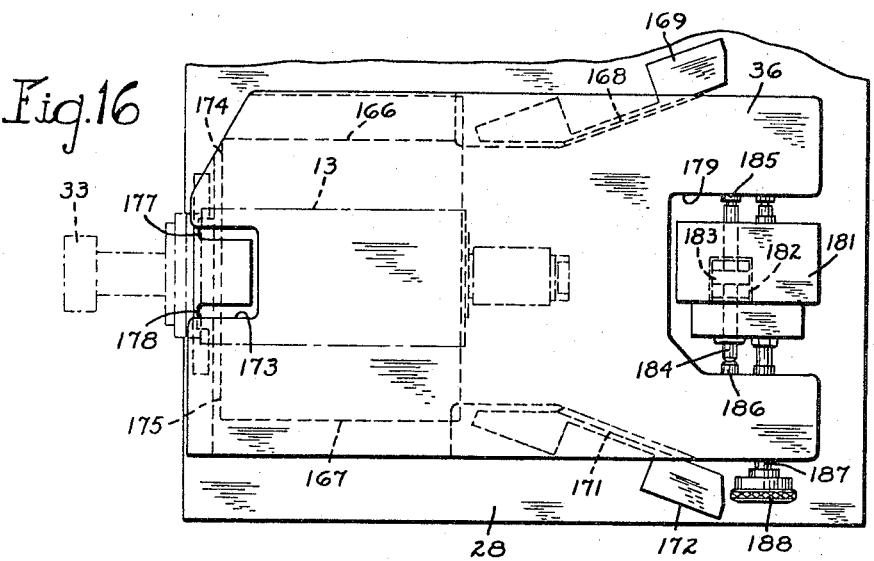
FIG. 16 is a plan view of the wheelhead table.
FIG. 17 is a plan view, somewhat schematic in nature, of the workhead table.
Figure 21:
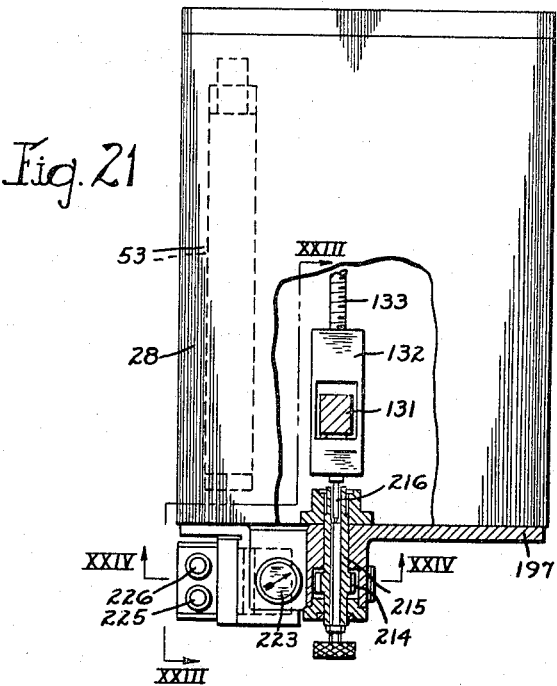
FIG. 21 is a horizontal sectional view of the wheelhead table showing details of certain feed apparatus.

FIG. 16 shows the manner in which the swivel member 36 is rotated relative to the upper member 28 of the wheelhead table on the upper surface of which it lies. At the front and back, the swivel member is provided, respectively, with undercut recesses 167 and 166. In the recess 166, and fastened by one end to a suitable vertical surface thereof, is a reed 168, the other end of which is fastened by a plate 169 to the upper surface of the upper member 28 of the wheelhead table. In the recess 167 a similar reed 171 is fastened to a finished vertical surface of the swivel member and the other end is fastened by a plate 172 to the upper surface of the upper member of the wheelhead table. The left-hand end of the swivel member 36 is provided with a rectangular notch 173 over which the wheelhead 13 would normally be mounted (as shown in doted lines). At the rearward side of the notch, the swivel member is provided with an undercut recess 174 and at the front side of the notch 173 the swivel member is provided with another recess 175. A reed member is mounted on the surface of the upper member 28 underlying the notch 173 and is provided with one reed 177 which extends upwardly and is attached at its upper end to the swivel member on a vertical surface of the recess 173. At the forward side a reed 178 extends forwardly and is bolted to a finished vertical surface of the recess 175. The only physical connection between the swivel member 36 and the upper member 28 of the wheelhead table is through reeds 168, 171, 177 and 178; the swivel member, therefore, behaves as though it were swinging about a vertical pivot point at the center of the notch 173. The right-hand end of the swivel member 36 is provided with a rectangular notch 179. Mounted on the upper surface of the upper member 28 of the wheelhead table and lying in the notch 179 is a block 181. This block is provided with a cylinder 182 containing a piston 183 having a piston rod 184 which extends entirely through the block 181 on either side and contacts hardened metal buttons 185 and 186 mounted on vertical longitudinal surfaces of the notch 179. Any movement of the piston rod 184, therefore, is transmitted directly to the swivel member 36. A stop screw 187 extends through the swivel member 36 and engages the block 181; its position is adjustable by means of a knob 188 at the front of the machine.

The manner in which the swivel member 25 of the workhead table is adjustable relative to the upper member 24 is clearly demonstrated in FIG. 17. First of all, the swivel member is provided with a curved rack 189 whose pitch circle is concentric with the bolt 191 extending through the swivel member 25 from the slide 105. The swivel member is also provided with two slots 192 and 193 through which bolts extend into the apertures 108 and 106 in the two slides. With this arrangement, it is possible to rotate the workhead so that the workpiece behaves as though it were being rotated about a vertical pivot line indicated by the reference letter A.

FIGS. 18, 19, and 20 show the manner in which the upper member 28 and the lower member 27 of the wheelhead table are slidably associated by means of the guide bar 53. First of all, the lower member 27 is provided with three transversely spaced abutments 194, 195, and 196 through which the guide bar 53 extends and in which it is locked and supported. This view also shows the aprons 197 and 198 which extend downwardly from the upper member 28 and cover the vertical surfaces of the lower member 27. Extending downwardly from the upper member 28 are two abutments 199 and 201, each having a bore through which the guide bar 53 extends. In the case of abutment 201, it is provided with a bore 202 which is formed with annular hydrostatic pockets, such as the pocket 203, to which oil is admitted through a passage 204. As is evident in FIG. 20, these pockets are arranged in groups of three around the bar and each pocket is connected through its own restriction coil, such as the coil 205 associated with the pocket 203, to a hydrostatic oil manifold 206. At the left-hand end, the cylinder is provided with a reduced portion 207 which extends through a cylinder head 208 so that the large central portion of the bar acts as a piston and combines with the bore and the cylinder head 208 to form a cylinder to which oil is introduced through a passage 209. It can be seen that pressure oil admitted through the passage 209 operates to move the upper member 28 forwardly of the machine and, therefore, to move the wheel 33 out of contact with the workpiece surface. At the other end, the piston is provided with a substantially reduced portion 211 which extends through a cylinder head 212 which is bolted over the end of the abutment 201 so that the bore 202 forms with the shoulder at the end of the central enlarged portion of the guide rod 53 and with the cylinder head 212 a cylinder to which pressure oil is admitted through a passage 213; such admission of oil serves to move the upper portion 28 rearwardly of the machine or, in other words, serves to move the wheel 33 into engagement with the workpiece on a feeding movement. It will be understood that the other supporting surfaces for the upper member 28 (that is, the mating surfaces 49 of the abutment 48 and the surface 51 of the abutment 52) reside at the extreme right-hand end of the wheelhead table and are provided with hydrostatic oil pockets in the same manner as the surface 41 which contacts the surface 39 of the way 38 in the workhead table.

Figure 22:
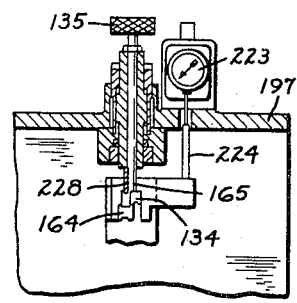
FIG. 22 is a similar horizontal sectional view of the feed apparatus taken at another level.
Figure 23:
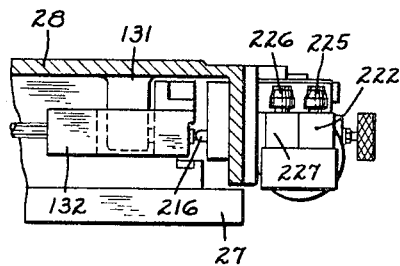
FIG. 23 is a view of the apparatus taken along the line XXIII—XXIII of FIG. 21.
Figure 24:
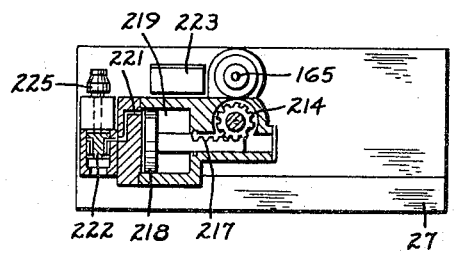
FIG. 24 is a vertical sectional view taken on the line XXIV—XXIV of FIG. 21.

Although the apparatus would normally use the controlled-force feed method, it is impossible to use the controlled-rate feed method by use of the apparatus shown in FIGS. 21, 22, 23, and 24. Mounted on the front apron 197 of the upper member 28 of the wheelhead table is the pin 165 which, as has been described, is adjustable by means of a hand wheel 135 at the front of the machine. Another pin 216 is also located on the apron and rotation of a shaft 215 with which the pin is associated by screw means causes advancement or retraction of the pin forwardly and rearwardly of the machine. Now, the shaft is provided with a gear 214 mounted on the shaft 215 which engages the pin 216. The gear 214 is engaged by a rack 217 formed on the piston rod of a piston 218. This piston slides in a cylinder 219 and receives oil through a passage 221 after it passes through an adjustable valve 222. As is best shown in FIG. 22, mounted beside the apparatus is a dial indicator 223 having an actuating rod 224 which extends through the apron 197 and comes into contact with an extension of the compensating slide 132. The dial indicator, therefore, shows, during a grinding cycle, the relative positioning of the upper member 28 and the lower member 27. The setting of the valve 222 is determined by means of a knob 225. In FIG. 22 it can be seen that the roughing switch 134 and the finish switch 164 reside at a level somewhat above the horizontal level of the section shown in FIG. 21, as is also evident in FIG. 24. An adjustable pin 228 extends through the apron 197 to engage the finish switch 164. Another passage for the admission of oil opens into the end of the cylinder 219 and the flow of oil through this passage is controlled by a knob 226 operating on a valve 227 similar to the valve 222. The knob 225 and the valve 223 are used for adjusting the feed during the roughing portion of the cycle, while the knob 226 and its associated valve 227 are used to adjust the feed into the cylinder 219 (and, therefore, the feed of the wheel 33 into the workpiece) during the finish part of the cycle.

FIGS. 25, 26, and 27 show the construction of the dressing apparatus 129. The apparatus is provided with a main body 229 through which extends a small bore 231 in which is slidably carried a rod 232 at the outer end of which is mounted a diamond 233. Entering the other end of the main body is a counter-bore 234. The rod 232 extends into the bore 234 a short distance and is provided with an outwardly extending plate 235 against which presses a coil spring 236 which resides in a small counter-bore 237. This biases the rod to the right (in FIG. 27). The end of the rod 232 which extends into the counter-bore 234 is also provided with a ratchet wheel 238 which is keyed to it and which is engaged by a pawl 239 fastened to the lower end of a piston rod 241. This piston rod has connected at its upper end a piston 242 which resides in a vertically-arranged cylinder 243 mounted on the main body. The cylinder is suitably provided with means for introducing oil to either side of the piston 242 to provide for reciprocation of the piston and of the piston rod 241. This reciprocation causes rotation of the rod 232 and of the diamond 233. At the right-hand end of the counterbore 234 it is provided with a sleeve 244 which is bolted to the main body thorugh an outwardly-extending flange. On the outer end of this sleeve is mounted an electric motor 245; the output shaft 246 of the motor is connected through a flexible connector, such as a bellows 247, to a nut 248. This nut is provided with threads which engage a threaded stem 249 extending to the right from a piston-like member 251 which is slidably mounted in the counterbore 234. The center portion of the member 251 operates through a ball 252 on the inner end of the rod 232 so that the motor 245 may push the rod 232 to the left against the restraint of the spring 236 to cause forward feeding of the diamond 233.

In FIG. 28 is shown the general electrical and hydraulic plan of the machine. The oil-pressure motor 253 drives a pump 254 which receives its oil from a sump 255. A line 256 leading directly from the pump carries oil at a high pressure, such as 500 lbs. per square inch. Some of this oil passes through a pressure-regulating apparatus 257 and supplies it to a line 258 at an intermediate pressure, such as 80 lbs. per square inch. Another line 259 carries oil at a low pressure, such as 25 lbs. per square inch. Furthermore, a line 261 serves as a drain line to return oil to the sump 255. If the machine is used as a controlled-rate feed machine, the valves 222 and 227 control the amount of oil passing to the feed rate cylinder 219. On the other hand, if it is used as a controlled-force machine, the valves 262 and 263 control the pressure of the oil which is transmitted to the feed cylinder 212, the oil being controlled by solenoid valves operated from the electrical control cabinet 18. The cylinders include the wheelhead swivel cylinder 182, the compensation cylinder 145, the compensation selective cylinder 153 and, of course, the controlled-rate feed cylinder 219 and the controlled-force feed cylinder 212. This same oil is introduced through solenoid valves to a forked gauge cylinder 264, a load and unload cylinder 265, the diamond-turner cylinder 243, the table cylinder 75, the cylinder 110 associated with the cam follower, and the cylinder associated with the shock absorber 71. These solenoid valves and cylinders are controlled in the usual way in the electrical control cabinet 18 to cause the machine to run through a cycle.

The operation of the apparatus will now be readily understood in view of the above description. FIGS. 29 through 33 show more or less schematically the manner in which the elements operate during the grinding cycle. The workhead table 24 and the workhead 12 carry the workpiece 31 longitudinally along the line X—X. The wheelhead table 26 carries the wheelhead 12, the spindle 32, and the abrasive wheel 33 at a right angle to the longitudinal direction or along the line Y—Y; it does so with a force in the horizontal plane, the force being transmitted in the grinding action between the wheel 33 and the workpiece 31. The grinding force produces a bending of the wheel spindle 32 which is shown in an exaggerated manner in the drawing. Now, the force which is used to produce this grinding will be quite large in a so-called "roughing" portion of the grinding cycle; such a roughing force will, naturally, bend the spindle 32 much greater than a lesser force. The grinding cycle is terminated in a finish cycle in which a lesser force is used in the grinding; of course, this lesser force will produce substantially less bending of the spindle. Since the abrasive wheel 33 is dressed to a true cylinder, any bending of the spindle 32 will cause the cylindrical wheel to reside at a substantial angle to the longitudinal line X—X and will produce a tapered bore. According to the present invention, the workpiece is moved through an agle in the horizontal plane (shown as the angle B in the drawing) which will cause the elements of the cylindrical surface of the wheel 33 to be exactly parallel to the axis of the workpiece when the spindle 32 is bent by the finish grinding force. During the roughing portion of the cycle, the spindle 32 is subjected to an additional bending; to compensate for this, the wheelhead swivel member 36 is rotated through a substantial angle (shown as the angle C) about a vertical pivot in the general vicinity of the spindle 32. During the roughing cycle, the amount of angular swiveling represented by the angle B and the angle C will exactly compensate for the bending of the spindle at that constant, predetermined force. During the finish portion of the cycle, the wheelhead swivel is returned to its position in exact alignment with the line X—X.

Referring to FIGS. 29 through 33, it can be seen that in FIG. 29 is shown the relationship of the parts at rest with no grinding taking place between them. With the workpiece 31, the wheel 33, the spindle 32, and the wheelhead 13 in exact axial alignment along the X—X axis (or with the axis of the workpiece, on the one hand, and the axis of the wheel, spindle and wheelhead, on the other hand, parallel to one another and parallel to the X—X axis). Now, when the wheelhead 13 is moved along the Y—Y axis and contacts the workpiece with a force which (in FIG. 30 is shown as a low or finish grinding force), the spindle 32 is bent slightly and, if nothing is done about this, the wheel 33 occupies an inclined position within the workpiece (because of the spindle bending or deflection) and the workpiece is ground with a tapered bore, the large end of the bore facing the wheelhead. In FIG. 31 is shown the relationship when, with low force grinding, the workpiece is swiveled through an angle B which is selected to exactly compensate for the spindle deflection. In this situation, it can be seen that the cylindrical surface of the wheel 33 has its axis exactly parallel to the axis of the workpiece so that a straight cylindrical bore is formed. In FIG. 32 is shown the situation when an extremely high force (which is selected as the force required for rough grinding) is used; the spindle 32 is bent even more than in FIGS. 30 and 31, where a low force is used. This means that, even though the workpiece 31 is still inclined at an angle B, the cylindrical surface of the wheel 33 still lies at a substantial angle to the axis of the workpiece so that a tapered bore is produced, the large end of the bore facing toward the wheelhead. In FIG. 33 is shown what happens when the wheelhead 13 is swiveled through an angle C which is selected to exactly compensate for the added deflection of the spindle 32 brought about by the diffrence in force between the high force situation and the low force situation. In this figure it can be seen that the wheel 33 is exactly parallel to the axis of the workpiece so that a straight bore is ground, this being the desired situation.

The relationships shown in FIGS. 29 through 33 appear during the operative cycle of the machine. The situation shown in FIG. 29 would exist between the parts of the machine if the workhead table and the wheelhead table were in non-swiveled positions. If feeding of the wheelhead took place by the admission of oil behind the cylinder head 212 around the reduced portion 211 of the guide bar 53, the bore in the workpiece would be ground with a taper, as shown in FIG. 30. However, the workhead table is initially swiveled by a predetermined angle B, so that the bore would be straight during the finish portion of the cycle. However, as is well known, the first part of the grinding cycle is the roughing portion and, at that time, high pressure oil is admitted behind the cylinder head 212, thus forcing the upper member 28 of the workhead table to the rear bringing the wheel 33 into contact with the workpiece with a high force. However, to avoid the taper shown in FIG. 32 which would otherwise exist, the wheelhead table is swiveled through an angle C during this roughing portion of the cycle by admitting oil into the cylinder 182, the amount of swiveling action being determined by the setting of the knob 188 which sets the stops. At the end of the roughing portion of the cycle, the wheel is moved away from the workpiece by backing off the wheelhead table. This is accomplished by causing the oil behind the cylinder head 212 to go to "drain," while pressure oil is admitted behind the cylinder head 208. This throws the workhead table forwardly very quickly and not only relieves spindle deflection but also removes the wheel (even in unstressed spindle position) from the surface of the workpiece. The workpiece is moved longitudinally outwardly and, of course, the wheel head is returned to its unswiveled position in alignment with the axis X—X and the dressing apparatus moves past the wheel for a dress. The workhead table is moved away from the wheel, carrying the dressing apparatus 129 with it. The dressing apparatus dresses the wheel 33 so that it is ready for the finish grind portion of the cycle. At that time, the workhead table returns the workpiece to the position where the wheel 33 resides in the bore of the workpiece and, then, the wheelhead table is moved laterally under the impetus of low pressure oil behind the cylinder head 212 so that a low force exists between the wheel 33 and the bore of the workpiece 31. Because of the fact that the workpiece 31 is inclined at an angle B, the deflection of the spindle 32 which takes place results in the wheel 33 producing an exact cylindrical bore. It should be understood in this connection that what is desired by means of the swiveling is to produce the exact taper desired in the bore; if the bore is to be a cylindrical one, naturally no taper is desired but, if a tapered bore is to be produced, then it is necessary that the taper produced not vary from the desired taper. In other words, the swiveling takes place so that the deflection of the spindle produces no variation from the desired taper, whether this desired taper be zero (as in the case of a cylindrical bore) or a substantial amount (as in the case of a tapered roller bearing race or similar article).

The swiveling of the wheelhead swivel member 36 takes place, as has been stated, by the admission of oil to the cylinder 182, so that the table moves clockwise about a pivot point which is between the reeds 177 and 178. This swivel position is automatically occupied by the wheelhead swivel member relative to the X—X axis only during the rough grinding position of the cycle. At other times, the oil is released from the cylinder 182 and the swivel member occupies the straight aligned position.

The longitudinal motion of the upper portion 24 of the workhead table 22 (relative to the lower member 23 of that table) along the way 38 and the V-way 42 is regulated by the positions of the dogs 61 which strike upwardly-extending fingers from the switch box 59, the switches having the effect in the control circuitry of valving oil to the table control cylinder 75. In order to change the wheel and to dress, the upper member 24 of the workhead table is moved to the left in FIG. 4 until it arrives at the shock absorber 71. This absorber has the effect of lessening vibrations which take place when the table is stopped at that extreme position. In approaching the workpiece, the table is actuated by admitting oil through the port 77 to the right-hand side of the piston 74 in the table control cylinder 75. Eventually, the cam follower 86 strikes the cam 83. This would be an undesirable shock and vibration situation if it were not for the fact that the cam follower is mounted on the crank arm 98 whose outboard end engages the piston 110 which, because of the pumping of oil through its system, acts as a shock absorber. Furthermore, this piston, because of the oil on the large side of the piston, continuously maintains the crank arm and the cam follower 86 in an extreme clockwise position as it is viewed in FIG. 6. The rotation of the cam 83 by means of the oscillator motor 66 produces the reciprocation of the workpiece relative to the wheel that is necessary in adequate grinding. The desirable situation is that the wheel be substantially longer than the bore in the workpiece and that the reciprocation be small enough so that the wheel never leaves the bore; in other words, it is desirable that all parts of the surface of the bore be contacted by the wheel at all times, thus preventing "bell-mouth." The feed positions of the wheelhead table 26 are determined by the switch box 57 which is contacted by dogs 58. More particularly, these dogs indicate when the table has advanced transversely to a point at which it is evident that the wheel 33 has been dressed to the point where it must be discarded. When this point is reached, it is indicated on the front of the control panel by a lamp and the operator pushes a "new wheel" button which moves the workhead away from the wheel and also acts through the compensating mechanism to return the wheelhead table to its forwardmost "new wheel" position. After the change of wheel, it is necessary to remove a substantial portion of the wheel by dressing, and this is done automatically until one of the dogs 58 indicates to a switch in the switch box 57 that the new wheel has been substantially dressed so that it is possible to continue to grind successive workpieces.

Coolant flowing down over the working surface falls into the inclined chutes 34 and troughs 35 of the lower base 11 and flows through the pipe 21 into the coolant tank 19. As is evident in FIG. 3, the forces which operate between the wheel and the workpiece extend downwardly toward the rear of the machine. The force of the wheel on the workpiece is transmitted to the workhead table and, as is evident, the table cannot slide or vibrate sideways under these forces because one of the inclined surfaces of the V-way 42 is substantially at a right angle to the line of force and in the same direction. The use of hydrostatic lubrication in the way 38 and the V-way 42 between the upper portion 24 and the lower portion 23 of the workhead table causes a very rigid table construction that does not "give" under reciprocating and changing forces.

The swivel member 25 of the workhead table 23 may be swiveled relative to the upper member 24 of the table for one of two reasons. First of all, it may be swiveled in order to produce the angular position to place the workpiece at the angle B; the whole swivel member is moved by rotating the pinion 114 after the bolts in the slots 192 and 193 have been loosened. After the angle has been set, of course, the bolts are tightened up again. The angle B as a practical matter is so small that it is usually not necessary to compensate for the changed lateral position due to rotation. However, when the swivel member 25 is used, for the second reason, to deliberately produce a substantial taper in the workpiece (as when a tapered roller bearing race is being ground), it is necessary to actuate the feed screw 112 to cause the slide 105 to carry the swivel member in a diagonal transverse direction to return it to the point from whence it was swung by the swiveling about the pivot pin 191.

It will be understood in connection with FIGS. 13, 14, and 15 that, as is usual practice, after the wheel is dressed, the wheel must be moved forwardly toward the workpiece surface a certain distance; this is known as "compensating." In other words, it "compensates" for the material which is removed from the wheel by dressing. In the present case, it is, of course, possible to adjust the compensating slide 132 by rotating the hand wheel 147; this is usually used in setting up the machine. As is shown rather schematically in FIG. 13, the upper member 28 of the wheelhead table is moved from a forward position (where the stop 131 contacts the forward surface of the notch in the compensating slide) to a rearward position. The back surface of the notch only serves as a limiting stop and is normally not reached during ordinary grinding cycles. The compensating slide also serves the function not only of determining the forward stop position of the wheelhead table and the wheel but also of determining the important grinding points in the feed movement. As oil is introduced at the rear end of the main feed guide bar 53, the table moves rearwardly so that the feed switches 134 and 164 are reached by the actuating pins 165 and 228 which are mounted on the front apron of the table. Rotation of the compensating screw 133 in increments, of course, changes the position of the compensating slide and, therefore, changes the position of the front surface of its notch so that the stop 131 as it moves forward stops more and more rearwardly as the wheel is dressed. Of course, when a new wheel is placed in the machine, the motor 136 operates through the gear reduction 137 and the chain 138 to operate the compensating screw 133 very rapidly in the reverse direction. To do this, of course, it is necessary for the control apparatus to energize the electrical clutch 141 to connect it to the screw through the one-way rotary clutch 142. The amount of the incremental rotations of the compensating screw 133 are determined by the stroke of the cylinder 145 and this stroke is determined by the position at which the piston rod 144 strikes the cone 146. This cone occupies a forward or a rearward position, which positions are determined by the flange 159 on the shaft 161 and the flange 155 on the shaft 156, as shown in FIG. 15. The shaft 151 can, of course, occupy only one of these two positions as determined by the oil in the cylinder 153 which operates on the piston 152. The controls take care of this positioning automatically, thus providing a rearward position of the cone 146 when a small increment of compensation is desired. At certain times, when it is desired to have large amounts of compensation, the cone is moved forwardly of the machine, in which case the piston rod 144 makes a very large stroke and transmits a very large angle of compensating rotation to the screw. 133. It will be understood that the oil which is introduced for feeding is at high pressure for the rough grinding position of the cycle and at low pressure for the finish grind. This is determined by the settings of the valves 262 and 263 (see FIG. 28), as well as a controlled-force selector solenoid valve 266.

In connection with the feed apparatus shown in FIGS. 21, 22, 23, and 24, it should be noted that this is provided to permit controlled-rate grinding which may be desirable at times. Normally, however, the present machine would be used for controlled-force grinding. If controlled-rate grinding is used, however, it is produced by introducing oil to the rear of the guide member 53 thus bringing about a feeding movement of the table at a substantial rate. As the table moves rearwardly to feed the wheel into the workpiece, the pin 216 engages a suitable surface on the compensating slide 132 which, it will be recalled, is securely connected to the lower member of the wheel head table and does not move with the upper member. The oil behind the wheelhead table cylinder attempts to move the table rearwardly, but, of course, this movement is hampered by the engagement of the pin 216 with the compensating slide 132. However, the pin is moved forwardly at a selected rate relative to the apron 197 of the upper member of the wheelhead table by means of the cylinder 219. Normally, one rate of feed would be used at the rough grind as determined by the setting of the knob 225 of the valve 222 and another at the finish grind as determined by the setting of the knob 226 of the valve 227, thus controlling flow of oil behind the piston 218. If the feed rate which is selected is so great that the grinding of the wheel through the workpiece cannot keep up with it without grinding force increasing greatly, the pin 216 leaves the end of the compensating slide 132; rather, if the force due to the rapid retraction of the pin 216 exceeds a pre-determined amount, the wheel will not move faster through the workpiece but will be limited by the force produced by the oil behind the guide member 53. In other words, the controlled pressure of the oil in the cylinder controls the maximum force which may be obtained by the use of the controlled-rate apparatus.

An examination of this machine will show that there are a great many decided advantages to be obtained from it. For one thing, the controlled-force system of grinding produces workpieces at the highest grinding rate in the shortest time. With the double-swivel method of compensating for the spindle deflections which are obtained at high grinding rates, the grinding cycle is substantially reduced because maximum grinding forces may be used without fear. The construction of this machine is quite simple, thus resulting in substantially improved maintenance and operation. The coolant guards are simple to remove and replace. The vibration characteristics of the machine are substantially improved over known machines of this type. The rapid and effective grinding cycle is obtained without sacrifice in the quality of the finished surface. One of the substantial advantages of this machine is its ability to accept larger rough stock variations, not only because of the improved vibration characteristics of this design but also because of the fact that maximum grinding forces are reached very quickly, which is not true when grinding according to the feed-rate principle. The length of the spindle 32 can be made very short; that is to say, the unsupported cantilver length as it emerges from the wheelhead 13 can be quite short because of the method in which the workhead table is pivoted. It is not necessary to provide substantially pivotal structural members underlying the workpiece in order to obtain a pivot line which extends through the workpiece. This means that the front of the workhead is substantially clear of protruding abutments so that the wheelhead and its supporting members can be moved very close to the facing surfaces of the workhead. There is no need, therefore, for a long spindle on which the wheel is mounted and the deflection is substantially less than in previously known machines of this type. The provision of hydrostatic lubrications means that the table and cross slideways will be substantially free of wear and also that their spring characteristics will be quite high or "stiff." The reduction in vibration problems is furthermore brought about because of the fact that there is no table overhang, either in the case of the workhead table or the wheelhead table. By using a very rapid backoff, the troublesome runout line due to the wheel dragging through the bore is eliminated and a fixed diamond may be used, the term "fixed" being used to indicate a diamond which it is not necessary to move out of the path of the wheel after the dressing cycle is over. The fixed diamond mounting on the wheelhead is less susceptible to excitation. The cross-slide and table ways are well damped to eliminate troublesome machine resonances. The use of hydrostatic lubrication in the ways permits the machine to be made with flame-hardened ways rather than the previously-known scraped ways; this is not only cheaper, but the hardening of the ways makes for a longer lasting surface. The machine is arranged so that oil is pumped into hydrostatic ways for a short period of time before the machine is operated to assure that a substantial oil film exists between the ways before movement takes place. The hydrostatic pocket location is selected to take care of the fact that the center of gravity of the tooling arrangement changes during the swivel. The stroke of the workpiece reciprocation is adjustable by means of the cam; the location of the reciprocating stroke is also adjustable. The provision of pressurized air between the two parts of both tables assures that swarf, moisture, and other deteriorating elements do not have access to the ways, thus promoting longer life.

Minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent, is:

1. A grinding machine, comprising
  (a) a lower base,
  (b) a workhead table mounted on the base, the workhead table including a lower member and an upper member slidable relative to each other along an imaginary line,
  (c) a wheelhead table mounted on the base, the wheelhead table having an abrasive wheel and including a lower member and an upper member slidable relative to each other in a direction transverse of the said line,
  (d) means bringing about relative sliding movement of the upper and lower members of the workhead and wheelhead tables to bring about engagement of the wheel and workpiece for a grinding operation,
  (e) and a compensation and feed mechanism including a transversely-movable stop member which is provided at one end with a motor-driven compensating screw and at the other end with a driven feed screw.

2. A grinding machine, comprising
  (a) a lower base,
  (b) a workhead table mounted on the base, the workhead table including a lower member and an upper member slidable relative to each other along an imaginary line,
  (c) a wheelhead table mounted on the base, the wheelhead table having an abrasive wheel and including a lower member and an upper member slidable relative to each other in a direction transverse of the said line,
  (d) means bringing about relative sliding movement of the upper and lower members of the workhead and wheelhead tables to bring about engagement of the wheel and workpiece for a grinding operation,
  (e) and a compensation and feed mechanism including a transversely-movable compensating slide which is connected at one end with a motor-driven compensating screw and at the other end contacting a stop member with a motor-driven feed screw.

3. A grinding machine, comprising
  (a) a lower base,
  (b) a workhead table mounted on the base, the workhead table including a lower member and an upper member slidable relative to each other along an imaginary line,
  (c) a wheelhead table mounted on the base, the wheelhead table having an abrasive wheel and including a lower member and an upper member slidable relative to each other in a direction transverse of the said line,
  (d) means bringing about relative sliding movement of the upper and lower members of the workhead and wheelhead tables to bring about engagement of the wheel and workpiece for a grinding operation,
  (e) a diamond mounted on the workhead table for engagement with the wheel for a dressing operation, and a compensating mechanism for feeding the wheel transversely of the said line and including means for selectively compensating by a large increment or a small increment,
  (f) and a feed-rate mechanism for controlling the rate of feed of the workpiece relative to the wheel and including a motor-driven stop member which moves at a selected rate.

4. A grinding machine as recited in claim 3 wherein the compensation and feed mechanisms include a transversely movable compensating slide which is provided at one end with a motor-driven compensating screw and is operative at the other end to contact a motor-driven feed screw.

5. A grinding machine as recited in claim 4 in which is provided a controlled-force mechanism bringing about transverse movement of the upper member of the wheel-head table relative to the lower member with a predetermined force, the feed-rate mechanism permitting the same movement, the controlled-force mechanism limiting the force between the wheel and workpiece when the feed rate mechanism is operative.

References Cited

UNITED STATES PATENTS

| | | | |
|---|---|---|---|
| 2,127,856 | 8/1938 | Blood | 51—95 |
| 2,442,683 | 6/1948 | Green | 51—50 |
| 2,612,008 | 9/1952 | Kuniholm et al. | 51—290 X |
| 2,647,348 | 8/1953 | Hahn | 51—290 X |
| 2,680,941 | 6/1954 | Hahn | 51—50 X |
| 2,929,172 | 3/1960 | Pasell | 51—95 |
| 3,003,292 | 10/1961 | Thompson | 51—50 |
| 3,060,647 | 10/1962 | Dall et al. | 51—165 |
| 3,197,921 | 8/1965 | Hohler et al. | 51—103 |

LESTER M. SWINGLE, *Primary Examiner.*

ROBERT C. RIORDON, *Examiner.*

J. A. MATHEWS, *Assistant Examiner.*